INVENTOR.
DONALD F. BEALS &
LAWRENCE S. SCHWARTZ
BY Martin Lukach
ATTORNEY

3,343,160
ELECTRONIC NAVIGATION SYSTEM

Donald F. Beals, Monroe County, N.Y., and Lawrence S. Schwartz, Bernalillo County, N. Mex., assignors to General Dynamics Corporation, a corporation of Delaware
Filed Nov. 23, 1964, Ser. No. 413,259
6 Claims. (Cl. 343—7)

This invention relates to electronic navigation systems, and particularly to a system for deriving information as to the bearing of cooperating craft with respect to each other.

The invention is especially adapted for use with Tacan equipment of the type described in Patent No. 3,058,011, issued to D. A. Dutton on Oct. 9, 1962.

Since many Tacan equipped aircraft may be within the range of each other, it is difficult to unambiguously identify a particular aircraft or to distinguish aircraft from other spurious signal transmitting sources. The criterion by which a particular Tacan transmitting unit is distinguished from other similar units and from spurious signal sources is the degree of synchronism between interrogations and replies. While information as to the range of one Tacan equipped craft to another is being derived, the requisite synchronism may be maintained. However, when other information, such as the relative bearing or azimuthal relationship between these aircraft is desired, synchronism between the interrogating and reply signals may be lost. Accordingly, an element of ambiguity may exist as to which aircraft is being tracked while their bearing is being determined.

It is an object of this invention to provide an improved electronic navigation system.

It is another object of this invention to provide an improved system for providing a display of the relative bearing of two cooperating crafts.

It is a further object of the invention to provide an improved electronic system for indicating azimuthal relationship between cooperating aircraft which incorporate Tacan equipment.

It is a still further object of the invention to provide an improved system for deriving unambiguous information as to the relative bearing of cooperating craft.

It is a still further object of the invention to provide an improved electronic system for deriving information as to the relative bearing of cooperating craft which system is substantially immune to noise and other spurious signals.

Briefly described, a system embodying the invention includes an omnidirectional antenna and two directional antennas. The directional antennas are responsive to signals from directions angularly offset from each other. The omnidirectional antenna transmits interrogation signals to, and receives reply signals from, a cooperating craft. Switching means are operated when the reply and interrogation signals are synchronized with each other and enable the directional antennas to alternately receive successive reply signals. Antenna rotating means, as may be included in a servo system, is responsive to the signals from the directional antennas and rotates the directional antennas until equal strength signals are received by each of them. The antennas then are tracking the cooperating craft. The position of the antennas indicates the relative bearing of the cooperating craft. The directional antennas may be enabled for a relatively short period of time during which only reply pulses from the cooperating craft are expected. The system is therefore substantially immune to spuroius signals due to noise or undesired craft which occur at other times.

The invention itself, both as to its organization and method of operation, as well as additional objects and advantages thereof will become more readily apparent from a reading of the following description in connection with the accompanying drawings in which.

Figure 1:
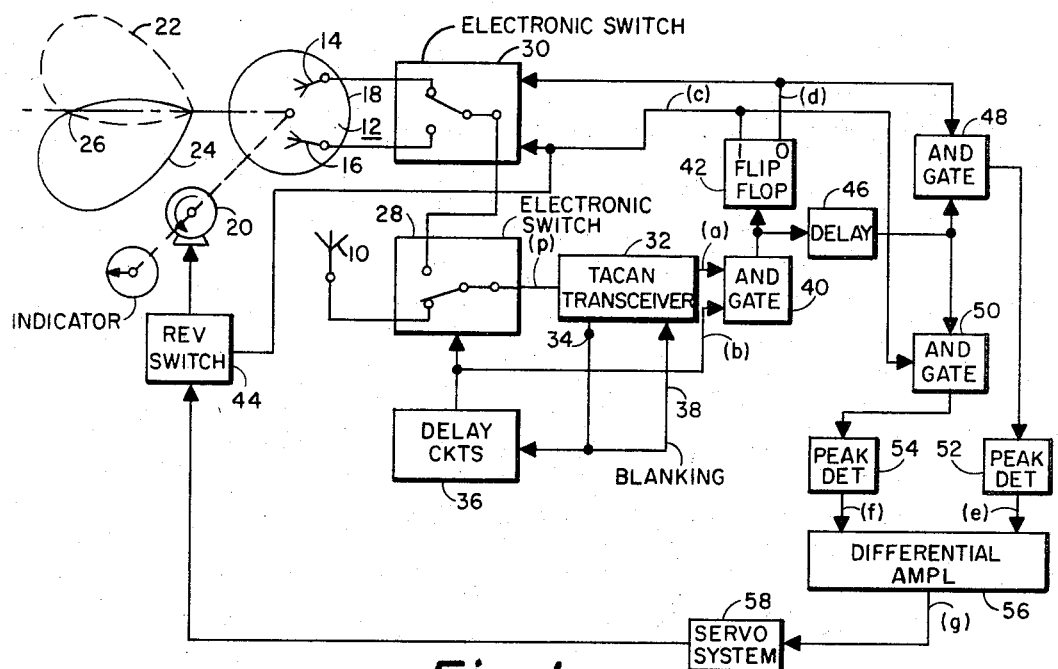
FIG. 1 is a simplified block diagram of a system embodying the invention.

Referring more particularly to FIG. 1, there is shown an electronic navigation system including an omnidirectional antenna 10 which may be of the type utilized in the Tacan art. This antenna 10 may be mounted on an aircraft, say on the underside thereof. An azimuth antenna array 12 includes two directional antennas 14 and 16 mounted on a platform 18. This antenna array 12 is rotatable by means of a servo motor 20 which drives the platform, directly or through a gear train. The antennas 14 and 16 may each include directional elements having reception patterns which include beams or lobes 22 and 24 respectively shown in FIG. 1 by the dash line and full line curves. The dash lobe curve 22 corresponds to the directional pattern or lobe for the antenna 16 and the solid line lobe 24 corresponds to the directional pattern or lobe for the antenna 14. These lobes are angularly displaced from each other, say by acute angles of about 30° to 40°. The lobes overlap or crossover at a point 26 along the line bisecting the angle between the lobes.

When a signal is received along this bisecting line through the point 26, the signal will be received in equal strength by both antennas 14 and 16.

The antenna may be made relatively small for mounting on an aircraft and to operate at the Tacan frequencies (1023 mc. to 1150 mc.). Physically the antenna may include a dish structure having receiving elements extending therethrough and spaced approximately ⅛ wavelength from the surface of the dish. The dish may be mounted flush with the surface of the aircraft, the dish being under the skin surface. A cover which may be flush with the skin, for aerodynamic purposes, may be disposed over the dish and protects the receiving elements which protrude therefrom.

The directional antenna array 12 and the omnidirectional antenna 10 are connected to switching means in the form of solid state electronic switches 28 and 30. For convenience of description, the switch 28 is referred to as the acquisition switch and the switch 30 is referenced as the tracking switch. The acquisition switch 28 may be mounted in the omnidirectional antenna 10 assembly. The switch 28 is effectively a single pole double throw switch which is voltage controlled by means of voltages applied to control terminals thereof. A suitable acquisition switch is manufactured by Microwave Associates of Burlington, Mass., their Catalog No. MA 8306–2L7ND.

The tracking switch, similarly with the acquisition switch, is effectively a single pole double throw switch and may be mountd under the dish of the antenna array 12. However, this switch is controlled by voltages applied to two terminals. When the voltage at one of these terminals is high with respect to the voltage at the other, the switch is conditioned to connect one terminal to the pole thereof. While when the other terminal has a high voltage with respect to the first mentioned terminal, the pole is switched to the other switch terminal and makes contact therewith. The tracking switch handles received signals while the acquisition switch handles transmitted signals as well as received signals. Accordingly, the tracking switch may be smaller and have less power handling capacity than the acquisition switch. A suitable tracking switch is obtainable from American Electronic Laboratories, Incorporated of Lansdale, Pa., their Catalog No. SNB 601.

The tracking switch is shown in the position last occupied during tracking. The acquisition switch normally connects the omnidirectional antenna 10 to a Tacon transceiver 32 such as the AN/ARN-21. This Tacan transceiver has a video output which provides the reply pulses which are received from an aircraft which is similarly equipped with a Tacan transceiver. The Tacan transceiver may generate interrogating pulses and receive reply pulses. A second aircraft, which cooperates with the aircraft equipped with the system shown in FIG. 1, upon receiving interrogation pulses, transponds with a reply pulse.

The transponder which generates reply pulses in response to receipt of interrogation pulses is known in the art as an air-to-air modification for Tacan equipment. Briefly, this modification involves a circuit which responds to the receipt of double pulse interrogation signals from a cooperating aircraft and a modulator which operates the Tacan transmitting portion of the Tacan set to generate and transmit a single reply pulse at a predetermined time after receipt of a double interrogation pulse from the cooperating aircraft. Accordingly, a single reply pulse is received by the Tacan transceiver 32 from a cooperating aircraft in response to a double interrogation pulse which was previously transmitted by the transceiver 32.

Figure 2:
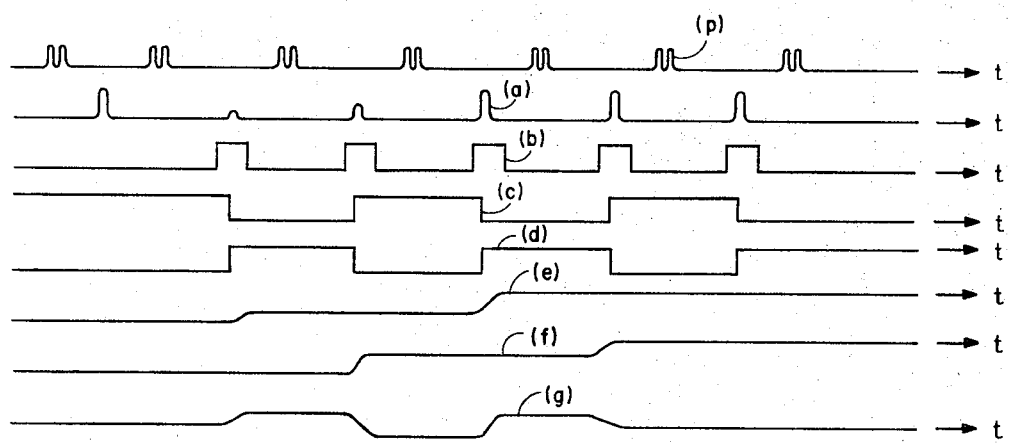
FIG. 2 is a diagram of the waveform of signals which appear in the system of FIG. 1.

The double interrogation pulses which are transmitted by the transceiver 32 are shown in waveform (p) in FIG. 2. The received reply pulses at the video output of the Tacan transceiver are shown in waveform (a) in FIG. 2.

The Tacan transceiver provides a selection gate pulse at an output terminal 34 thereof, when the reply pulses which are received by the transceiver are synchronous with the interrogation pulses which are transmitted by the transceiver 32. The manner in which these selection gate pulses are generated is well known in the Tacan art. The interrogation pulse pairs (waveform (p)) are transmitted at a pulse repetition frequency of 120 to 150 pulses per second. The cooperating aircraft upon receiving these interrogation pulses transponds, as mentioned above, with single reply pulses a predetermined time after receipt of interrogation pulses. The Tacan set derives the selection gate pulse when a significant number of reply pulses occur within a predetermined time after the transmission of the interrogation pulses. These reply pulses must also be received in a short time slot or gate before the selection gate pulse is generated.

The elapsed time between the transmission of the interrogation pulses and the reception of reply pulses is an indication of the distance or range between the two cooperating aircraft. When the selection pulse appears at the terminal 34, the criterion that the interrogation and reply pulses are synchronized with each other is satisfied. It is at this time that the bearing or azimuth of the cooperating aircraft with respect to the aircraft equipped with the system of FIG. 1 may be unambiguously determined without deterioration of the ranging function and without permitting spurious signals and noise from affecting the operation of the system.

The selection pulse is applied to delay circuits 36 which provides an output to the acquisition switch 28 which causes that switch to connect the directional antenna array 12 to the Tacan transceiver 32 input through the tracking switch 30. This connection is made in anticipation of the next reply pulse, since the selection gate pulse occurs in the slot when the next reply pulse is expected. The delay circuits 36 may include circuits for shaping the selection gate pulse and changing its duration. For example, the delay circuits may include one-shot multivibrators which operate in response to the leading edge of the selection gate pulse and provide an output pulse for operating the acquisition switch for a certain period of time, say 200 microseconds during the selection gate pulse interval. Simultaneously the selection gate pulse may be returned by way of a lead 38 to the Tacan transceiver for blanking the transmitter portion thereof during the selection pulse interval thereby preventing interrogation pulses from being applied through the switches 28 and 30 to the directional antenna array 12.

The output of the delay circuits 36 includes pulses within the time slot of anticipated reply pulses. These delay circuit pulses are shown in waveform (b) in FIG. 2. The tracking system responds to the reply pulses received by the transceiver 32 and rotates the directional antenna array 12 so that its orientation is an indication of the bearing of the cooperating aircraft.

The reply pulses which are received on one of the directional antennas, say the antenna 14 are derived by the Tacan transceiver and gated through a coincidence circuit, shown as an AND gate 40. This AND gate 40 is enabled by the output of the delay circuits 36. Accordingly, the tracking system has a significant degree of noise immunity since the AND gate prevents the reception of signals except during the interval when the reply pulses are expected.

The output of the AND gate 40 is applied to a flip flop 42, suitable amplifier circuits being provided as desired, and triggers the flip flop 42. Accordingly, the flip flop 42 is triggered and each reply pulse changes its state. The flip flop remains in its last state and changes states only when triggered. The state of the flip flop is therefore an indication of the last antenna which received the signal during a tracking mode of operation of the system.

In order to rapidly reacquire a signal, the directional antenna should rotate so that the antenna which last received a signal turns toward the lobe crossover point 26. To this end a relay operated reversing switch 44 connected to one of the flip flop output terminals is provided. The flip flop output terminal which is marked with a potential is an indication of the particular directional antenna say 14, which last received a signal. The motor 20 is reversed to rotate in a sense, say counterclockwise when antenna 14 last received a signal, to rotate the platform 18 in a direction to move antenna 14 toward the lobe crossover point 26.

Since the relative potential on the flip-flop output terminals ("1" or "0") reverses for each successive reply pulse, the antennas 14 and 16 alternatively receive successive reply pulses. These reply pulses are transmitted through a delay circuit 46, which may be a delay line, to both of a pair of AND gates 48 and 50, the AND gate 48 being enabled by the "0" output of the flip flop and the AND gate 50 being enabled by the "1" output of the flip flop. Accordingly, the AND gate 48 is adapted to pass reply pulses which are received by one of the directional antennas 14 while the other AND gate is adapted to pass reply pulses received by the other directional antenna 16. The delay circuit 46 is inserted to insure that the reply pulses reach the AND gates only after the flip flop 42 has changed state.

The reply pulses are transmitted to peak detectors 52 and 54 which may be diodes having integrating circuits connected thereto. The voltages provided by the peak detectors 52 and 54 are therefore functions of the amplitude or strength of the signals respectively received by different ones of the directional antennas 14 and 16. A different amplifier 56 provides an output voltage having an amplitude and polarity which is a function of the sense and magnitude of the difference between the peak detector 52 and 54 output voltages. This voltage is applied as an error voltage to a servo system 58 which provides an output voltage to drive the servo motor 20. The servo system 58 may be of any type known in the art which responds to the amplitude and sense of the difference of an error voltage which is applied thereto.

This error voltage is indicated in waveform (g) in FIG. 2. The voltages at the output of the peak detectors 52 and 54 are respectively indicated as waveforms (e) and (f) in FIG. 2. The "1" and "0" outputs of the flip flops are respectively illustrated in waveforms (c) and (d) of FIG. 2. The reply pulses (waveform (a)) vary in amplitude as the antenna platform 18 rotates. Successive ones of these reply pulses are peak detected in peak detectors 52 and 54. The differential amplifier output is an error signal (waveform (g)) which varies in amplitude and polarity in accordance with the difference between the peak detector output signals. Accordingly, when successive reply pulses from different ones of the antennas 14 and 16 are of equal amplitude, the error voltage (waveform (g)) is reduced to zero and the servo system has oriented the platform 18 so that the directional antennas are tracking the cooperating aircraft, that is, a line from the axis of rotation of the platform to the crossover point 26 is directed towards the cooperating aircraft.

An indicator which may be coupled to the shaft of the servo motor 28, directly or through a selsyn system therefore indicates the bearing of the cooperating aircraft. The indicator may be a selsyn which compares the positon of the platform 18 with the master compass in the aircraft. The result therefore may be displayed on the indicator as a true bearing of the aircraft.

From the foregoing description, it will be apparent that there has been provided an improved electronic navigation system whereby azimuthal information respecting cooperating aircraft may be determined. The system described is simplified in order to facilitate the explanation of the invention. Various modifications in the illustrated system, within the scope of the invention, accordingly will suggest themselves to those skilled in the art. The description therefore should be taken merely as illustrative and not in any limiting sense.

What is claimed is:

1. An electronic navigation system which includes a transceiver which generates interrogation pulses and receives reply pulses and detects synchronism therebetween, said system comprising
    (a) an omnidirectional antenna,
    (b) a directional antenna,
    (c) means including said transceiver for transmitting interrogation pulses with, and receiving reply pulses from, said omnidirectional antenna,
    (d) means included in said transceiver for enabling said directional antenna to receive said reply pulses when synchronism is detected between said interrogation and said reply pulses which are transmitted with and received on said omnidirectional antenna, and
    (e) means responsive to the reply pulses from said directional antenna for deriving azimuthal information as to the source of said reply pulses.

2. An electronic navigation system comprising
    (a) a directional antenna,
    (b) an omnidirectional antenna,
    (c) means for generating interrogation pulses for transmission,
    (d) means for receiving reply pulses,
    (e) switching means for connecting said receiving and generating means to said omnidirectional antenna until said repy pulses and said interrogation pulses are in synchronism with each other and then connecting said receiving means to said directional antenna for a limited period of time, and
    (f) means responsive to reply pulses received by said receiving means during said limited period of time for deriving information as to the relative bearing of a craft transmitting said reply signals and a craft transmitting said interrogation signals.

3. The invention as set forth in claim 2 including means for blanking said generating means during said limited period of time.

4. An electronic navigation system comprising
    (a) a directional antenna,
    (b) an omnidirectional antenna,
    (c) means for generating interrogation pulses for transmission,
    (d) means for receiving reply pulses,
    (e) switching means normally connecting said receiving means and generating means to said omnidirectional antenna and responsive to the said receiving means for connecting said receiving means to said directional antenna when said reply and interrogation pulses are synchronous with each other.

5. An electronic navigation system comprising
    (a) two directional antennas having receiving patterns including lobes which diverge angularly from each other,
    (b) an omnidirectional antenna,
    (c) interrogating pulse transmitting and reply pulse receiving means,
    (d) switching means including first means for alternatively coupling said transmitting and receiving means to said omnidirectional antenna and to said directional antennas,
    (e) means operated by said receiving means for conditioning said first means to couple said receiving means to said directional antennas when the reply and interrogation pulses received by and transmitted with said omnidirectional antenna are in synchronism with each other,
    (f) second means included in said switching means operated by said receiving means for alternately deriving successive ones of said reply pulses from different ones of said directional antennas, and
    (g) means for rotating said directional antennas until said reply pulses which are received by different ones of said antennas are of equal strength whereby the the position of said rotating means is indicative of the relative bearing of craft which respectively transmit said interrogation and reply pulses.

6. An electronic navigation system for indicating the bearing of cooperating aircraft with respect to each other comprising
    (a) an omnidirectional antenna,
    (b) two directional antennas having main receiving pattern lobes which diverge from each other at an acute angle,
    (c) first electronic switch for switching between alternate ones of said directional antennas,
    (d) a second electronic switch for switching between said omnidirectional antenna and said first switch,
    (e) a Tacan transceiver connected to said second switch and providing interrogation pulses, output reply pulses and selection gate pulses,
    (f) means operated by each of said selection gate pulses for operating said second switch for a limited period of time,
    (g) a first gate operative during said limited period for transmitting said output reply pulses,
    (h) a flip flop triggered by said output reply pulses transmitted by said gate and connected to said first switch for operating said first switch when said flip flop is triggered to each of its stable-states,
    (i) a pair of gate means controlled by said flip flop for respectively passing said output reply pulses transmitted by said first gate,
    (j) a servo system operated by said pulses transmitted by different ones of said pair of gates for rotating said directional antenna in a direction to reduce the difference in amplitude between said last named pulses, and
(k) means for indicating bearing operated by said servo system.

References Cited

UNITED STATES PATENTS

| | | | |
|---|---|---|---|
| 2,644,940 | 7/1953 | De France | 343—7.3 |
| 2,848,627 | 8/1958 | Majerus et al. | 343—7.3 |
| 2,912,686 | 11/1959 | Dodington et al. | 343—7.3 |
| 2,996,707 | 8/1961 | Hirsch | 343—7.3 |
| 3,130,401 | 4/1964 | Murphy | 343—6 |
| 3,161,871 | 12/1964 | Staples et al. | 343—6 |

RODNEY D. BENNETT, *Primary Examiner.*

CHESTER L. JUSTUS, *Examiner.*

P. M. HINDERSTEIN, B. L. RIBANDO,
*Assistant Examiners.*